United States Patent [19]
Georigiou et al.

[11] Patent Number: 5,307,342
[45] Date of Patent: Apr. 26, 1994

[54] HETEROGENEOUS PORTS SWITCH

[75] Inventors: Christos J. Georigiou, White Plains; Thor A. Larsen, Hopewell Junction, both of N.Y.

[73] Assignee: International Business Machines Corporation, Armonk, N.Y.

[21] Appl. No.: 753,281

[22] Filed: Aug. 30, 1991

[51] Int. Cl.⁵ .................. H04J 3/00; H04J 14/08; H04Q 11/04
[52] U.S. Cl. .................. 370/58.1; 370/58.2; 370/84; 370/91; 340/825.79; 375/111; 375/119; 359/115; 359/117
[58] Field of Search .......... 370/53, 58.1, 58.2, 370/58.3, 60, 60.1, 61, 67, 77, 79, 84, 85.1, 91, 112, 113, 97; 375/111, 118, 119, 120, 3, 7, 8; 340/825.79; 359/115, 117, 124, 127, 128, 113, 114

[56] References Cited

U.S. PATENT DOCUMENTS

| | | | |
|---|---|---|---|
| 4,147,894 | 4/1979 | Watanabe et al. | 370/84 |
| 4,215,245 | 7/1980 | Bellisio | 370/84 |
| 4,224,473 | 9/1980 | Kaul et al. | 370/84 |
| 4,258,433 | 3/1981 | Herschtal et al. | 370/84 |
| 4,488,294 | 12/1984 | Christensen et al. | 370/84 |
| 4,547,880 | 10/1985 | De Vita et al. | 370/91 |
| 4,597,073 | 6/1986 | Staples | 375/7 |
| 4,627,070 | 12/1986 | Champlin et al. | 375/3 |
| 4,631,720 | 12/1986 | Koeck | 370/84 |
| 4,639,910 | 1/1987 | Toegel et al. | 370/67 |
| 4,688,211 | 8/1987 | Van Simaeys et al. | 370/91 |
| 4,920,529 | 4/1990 | Sasaki et al. | 370/60 |
| 5,038,365 | 8/1991 | Belloc et al. | 370/84 |
| 5,063,576 | 11/1991 | Eguchi et al. | 370/58.1 |
| 5,099,234 | 3/1992 | Kraker | 370/58.1 |

Primary Examiner—Benedict V. Safourek
Assistant Examiner—Alpus H. Hsu
Attorney, Agent, or Firm—Sterne, Kessler, Goldstein & Fox

[57] ABSTRACT

A communication switch having heterogeneous ports. The heterogeneous ports are connected to nodes which may be operating at different frequencies and which may have different optical characteristics. In addition to the ports, the switch of the present invention includes a matrix controller and a matrix switch which is connected to the ports. When two ports want to communicate, the matrix controller commands the matrix switch to establish a physical connection between the ports. According to the present invention, data is transferred between the ports via the matrix switch in a serial and asynchronous manner. Because data is serially and asynchronously transmitted, high data rates through the matrix switch may be achieved.

22 Claims, 5 Drawing Sheets

HETEROGENEOUS PORTS SWITCH

DESCRIPTION

1. Technical Field

The present invention relates generally to communication switches, and more particularly to communication switches having heterogeneous ports.

2. Background Art

A conventional dynamic communication switch provides system-wide, non-blocking connectivity. A connection is established and broken in the switch based on a starting delimiter of a transmitted frame and on information contained in the transmitted frame's header. Once the connection is established through the switch, the switch becomes transparent to transmitted frames (that is, circuit switching is implemented). An example of such a conventional dynamic communication switch is the International Business Machines (IBM) ESCON Director 9032, 9033.

Conventionally, the communication switch assumes that all transmissions between switch ports and external attachments to the switch ports take place at the same bit rate. Additionally, the communication switch assumes that light sources associated with the switch ports and external attachments all have the same optical characteristics. The communication switch further assumes that photodetectors associated with the switch ports and external attachments have optical wavelength sensitivities which match the light source characteristics.

Thus, the conventional communication switch is limited because it does not support ports with different light sources (such as 0.8 u laser and 1.3 u LEDs or 1.3 u lasers). Also, the conventional communication switch is limited because it does not support simultaneous, different bit-rates (such as 200 Mbit/second, 1 Gigabit/second, and 265 Mbit/second) at its ports.

A prior solution to the above problem is presented in U.S. Pat. No. 4,639,910 to Toegel et al. Toegel describes an interconnect fabric for ports having different data rates. However, Toegel uses a time division multiplexed (TDM) bus. Thus, Toegel's TDM bus approach is flawed because data rate capability and number of nodes are limited.

Another prior solution to the above problem is presented in U.S. Pat. No. 4,885,741 to Douskalis. Douskalis describes a matrix switch which uses a time division multiplexed bus arrangement. Like Toegel, Douskalis is flawed because data rate capability and number of nodes are limited.

DISCLOSURE OF THE INVENTION

The present invention is directed to a communication switch having heterogeneous ports. The communication switch of the present invention supports fiber optic interconnections to "nodes" having different optical characteristics. Also, the communication switch of the present invention supports fiber optic interconnection to "nodes" having different bit-rates. A "node" consists of an optical transmitter and optical receiver, associated optoelectronic conversion electronics, and system interface electronics.

The communication switch of the present invention includes multiple ports. The ports are connected to nodes which may be operating at different frequencies and which may have different optical characteristics. The switch includes a matrix controller and a matrix switch which is connected to the ports. When two ports want to communicate, the matrix controller commands the matrix switch to establish a physical connection between the ports. According to the present invention, data is transferred between the ports via the matrix switch in a serial and asynchronous manner. Because data is serially and asynchronously transmitted, high data rates through the matrix switch may be achieved.

Each port contains a receive component and a transmit component. A receive component in a port receives data at a first frequency from a source node. The receive component sends the data via the matrix switch to a transmit component in another port at a second frequency. The transmit component sends the data to a destination node at the second frequency. According to the present invention, the first and second frequencies may be different. Therefore, the switch of the present invention supports nodes having different data rates.

The receive components in the ports have photodetectors which are optically sensitive to multiple wavelengths of interest (such as 1.3 u and 0.8 u). The transmit components in the ports have light sources which may transmit at multiple optical wavelengths. Because it detects and emits optical signals of different wavelengths, the switch of the present invention simultaneously supports nodes having different optical characteristics.

The foregoing and other objects, features and advantages of the invention will be apparent from the following more particular description of preferred embodiments of the invention, as illustrated in the accompanying drawings.

BRIEF DESCRIPTION OF THE DRAWINGS

The present invention will be described with reference to the accompanying drawings, wherein.

BEST MODE FOR CARRYING OUT THE INVENTION

Figure 1:
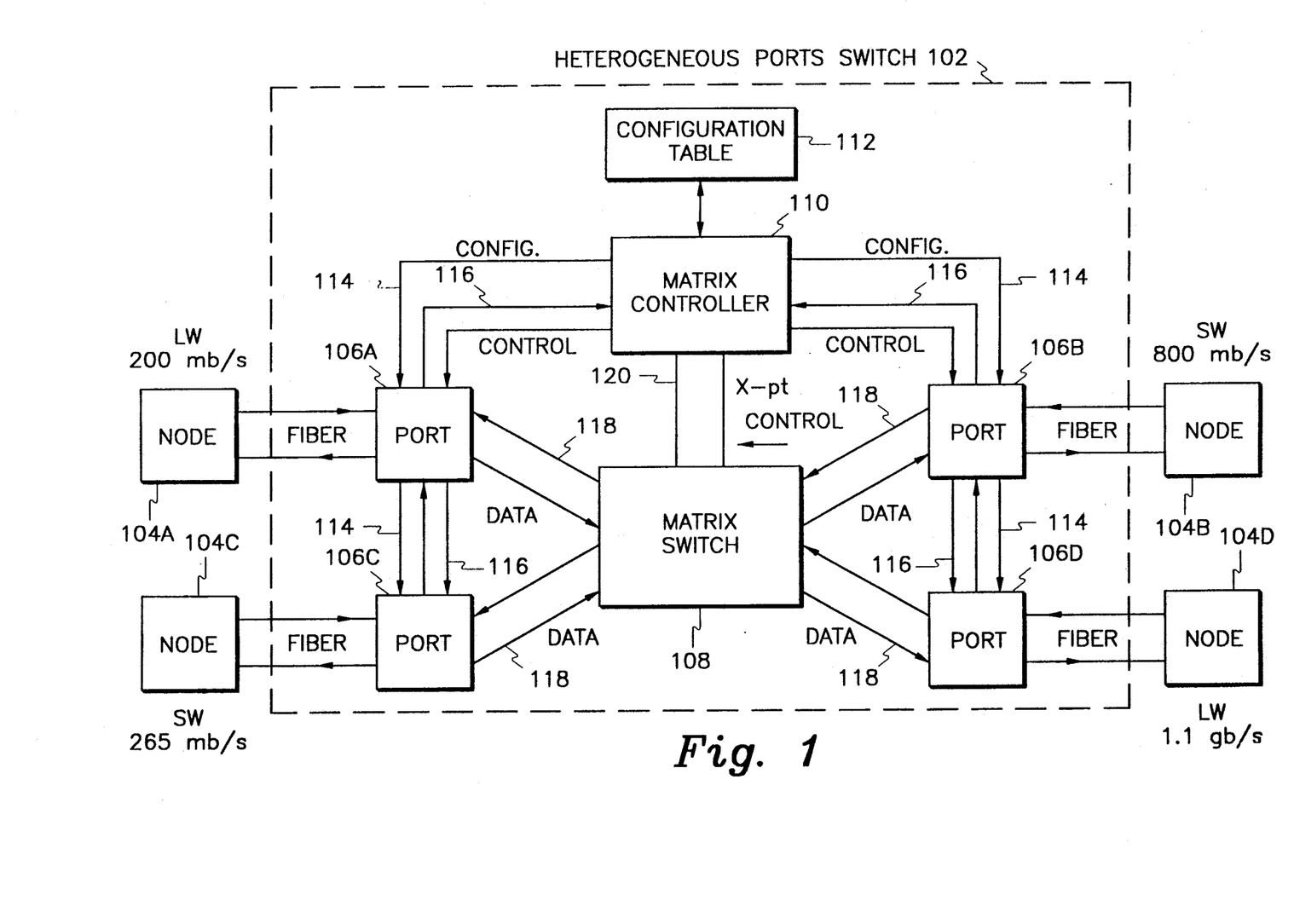
FIG. 1 illustrates a heterogeneous ports switch 102 according to the present invention.

FIG. 1 illustrates a heterogeneous ports switch 102 according to the present invention. The switch 102 includes multiple ports 106, a matrix switch 108, a matrix controller 110, and a configuration table 112. The configuration table 112 may be stored in a random access memory contained in the matrix controller 110.

The matrix controller 110 is connected to the ports 106 via a common bus having configuration lines 114 and control lines 116. The ports 106 are connected to the matrix switch 108 via data lines 118. The ports 106 are connected to external nodes 104. In a preferred embodiment of the present invention, the ports 106 are connected to the external nodes via fiber optic links.

As shown in FIG. 1, the nodes 104 have different characteristics. For example, the node 104A has a long wavelength (LW) light source and operates at 200 MBit/second. The node 104B has a short wavelength (SW) light source and operates at 800 MBit/second. As evident by FIG. 1, the switch 102 of the present invention simultaneously supports nodes 104 which have different fiber optic light sources and which operate at different bit speeds.

Figure 2:
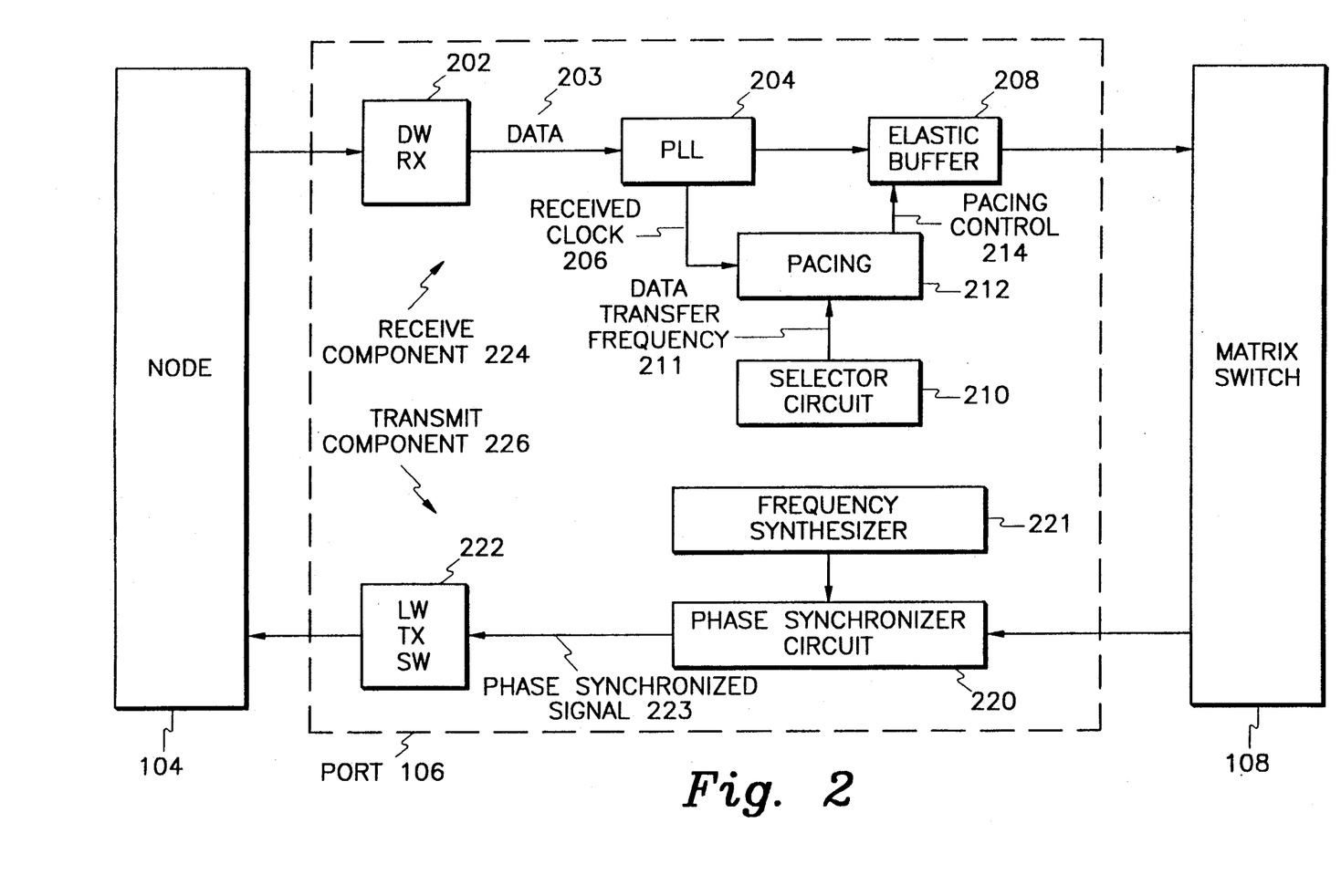
FIG. 2 illustrates a port 106 of the present invention.

FIG. 2 illustrates one of the ports 106 in greater detail. The ports 106 each contain a receive component 224 and a transmit component 226.

The receive component 224 contains a receiver (RX) 202, a programmable phase locked loop (PLL) 204, an elastic buffer 208, a selector circuit 210, and pacing circuitry 212. The transmit component 226 contains a phase synchronizer circuit 220 and a programmable frequency synthesizer 221. The phase synchronizer circuit 220 may contain an elastic buffer.

The operation of the switch 102 of the present invention is described below with reference to FIGS. 1 and 2. For illustrative purposes, a scenario wherein the node 104A is transmitting to the node 104B is used to describe the operation of the switch 102. In the following discussion, the port 106A is also called the receiving port 106A. The port 106B is also called the transmitting port 106B.

The node 104A transmits a frame to the receive component 224 of the port 106A. In the preferred embodiment of the present invention, all frames have the same frame format (that is, delimiters and header information). Also, in the preferred embodiment of the present invention, the frame is embedded in a serial optical data stream which is carried on the fiber optic link connecting the node 104A to the port 106.

The receiver 202 receives the frame and converts the frame from an optical signal to an electrical signal. The receiver 202 also amplifies the electrical signal. The general structure and operation of the receiver 202 is well known in the art.

The frame is received by the programmable PLL 204. The PLL 204 adjusts for frequency and phase disparities. The PLL 204 extracts the frame's clock frequency 206 from the frame. In this patent document, the frame's clock frequency 206 is also called the frame's received clock 206.

Conventionally, the PLL 204 has a single nominal frequency. However, according to the present invention, the PLL 204 has multiple available nominal frequencies. The nominal frequencies are selected by the matrix controller 110. Specifically, the configuration table 112 stores a switch configuration. The switch configuration identifies the nodes 104 which are connected to the ports 106. At initial program load (IPL), the matrix controller 110 determines the data rates of the nodes 104. The matrix controller 110 then appropriately selects the nominal frequencies in the PLLs 204 using the configuration lines 114 such that the nominal frequencies in the PLLs 204 are equal to the data rates of their respective nodes 104.

According to the present invention, the nominal frequencies may be different in the PLLs 204 of different ports 106. Therefore, the switch 102 of the present invention simultaneously supports nodes 104 which operate at different bit speeds.

After the PLL 204 extracts the received clock 206 from the frame, the frame serially travels to the elastic buffer 208. The pacing circuitry 212 controls the rate at which the frame enters the elastic buffer 208. Specifically, the pacing circuitry 212 clocks the frame into the elastic buffer 208 at a rate equal to the received clock 206. The pacing circuitry 212 performs a second function, as described below.

The frame is stored in the elastic buffer 208 until it is transmitted to the matrix switch. In the preferred embodiment of the present invention, the elastic buffer 208 has a depth equal to the maximum frame length, such as 1 kbyte.

Logic circuitry (not shown in FIG. 2) extracts connection information from the frame while the frame is in the elastic buffer 208. The connection information identifies the destination of the frame. The connection information is sent to the matrix controller 110 on the control lines 116.

Upon receiving the connection information, the matrix controller 110 attempts to make a connection in the matrix switch 108 between the source port 106A and the destination port 106B. For illustrative purposes, assume that such a connection is made in the matrix switch 108. The connection in the matrix switch 108 operates as a physical connection between the source port 106A and the destination port 106B. After establishing a connection in the matrix switch 108, the matrix controller 110 instructs the port 106 via the control line 116 to transmit the frame in the elastic buffer 208 to the matrix switch 108.

Upon receiving the instruction to transmit from the matrix controller 110, the frame is serially transmitted from the elastic buffer 208 to the matrix switch 108. As noted above, the pacing circuitry 212 controls the rate at which the frame enters the elastic buffer 208. Additionally, the pacing circuitry 212 controls the rate at which the frame is transmitted from the elastic buffer 208. Specifically, the matrix controller 110 accesses the configuration table 112 and determines the data rate of the destination node 104B. The matrix controller 110 then accesses the selector circuit 210 and selects a data transfer frequency 211 which is equal to the data rate of the destination node 104B. The pacing circuitry 212 then serially clocks the frame from the elastic buffer 208 to the matrix switch 108 at a rate equal to the selected data transfer frequency 211.

According to the present invention, the matrix controller 110 may use the selector circuit 210 to choose from a number of available data transfer frequencies 211. The data transfer frequencies 211 may either be generated locally from a low frequency source or may be generated in a central location and distributed to the ports 106.

Note that the receiving port 106A receives at one frequency (that is, the received clock 206) and the transmitting port 106B transmits at another frequency (that is, the data rate of the destination node 104B or, equivalently, the selected data transfer frequency 211). Therefore, the switch 102 of the present invention simultaneously supports nodes 104 which operate at different bit speeds.

Note also that frames are transmitted through the matrix switch 108 in a serial and asynchronous fashion (the frames are said to be transmitted asynchronously since a central clock is not used to coordinate the receiving port 106A and transmitting port 106B). Because data is serially and asynchronously transmitted, high data rates through the matrix switch 108 may be achieved.

The frame from the receiving port 106A is serially routed through the matrix switch 108 and arrives at a phase synchronizer circuit 220 of the transmit component 226 of the transmitting port 106B.

The phase synchronizer circuit 220 receives a nominal frequency from a programmable frequency synthesizer 221. The programmable frequency synthesizer 221, which is based on PLL concepts, has multiple available nominal frequencies. The matrix controller 110 selects one of the available nominal frequencies. Specifically, at initial program load (IPL), the matrix controller 110 accesses the configuration table 112 and determines the data rate of the destination node 104B connected to the transmitting port 106B. The matrix controller 110 then appropriately selects the nominal frequency of the programmable frequency synthesizer 221 in the transmitting port 106B using the configuration lines 114 such that the nominal frequency of the programmable frequency synthesizer 221 equals the data rate of the destination node 104B.

Since the frame is asynchronously transmitted through the matrix switch 108, the selected data transfer frequency 211 may be out of phase with the transmit frequency (that is, the frequency at which data is transmitted from the transmitting port 106B to the destination node 104B, or equivalently, the data rate of the destination node 104B). Therefore, the phase synchronizer circuit 220 in the transmitting port 106B adjusts for phase of the incoming data to align with the transmit frequency. The phase synchronizer circuit 220 can be implemented in a number of ways which are well known in the art. One way is to use a phase lock loop. Other ways are described in many publically available documents such as "1 Gb/s High-Speed Bit Synchronization LSI for B-ISDN" by Otsuka (*Electronics Letters*, Vol. 26, No. 10, May 10, 1990), which is herein incorporated by reference in its entirety.

The receiving port 106A may send idles to the transmitting port 106B prior to transmitting the frame in order to establish phase synch between the two ports 106A and 106B.

A phase synchronized signal 223 coming from the phase synchronizer circuit 220 is then sent to the transmitter 222. The transmitter 222 converts the frame from an electrical signal to an optical signal and serially sends the frame to the destination node 104B at the transmit frequency.

Aspects of the switch 102 of the present invention shall now be described in greater detail.

Figure 3:
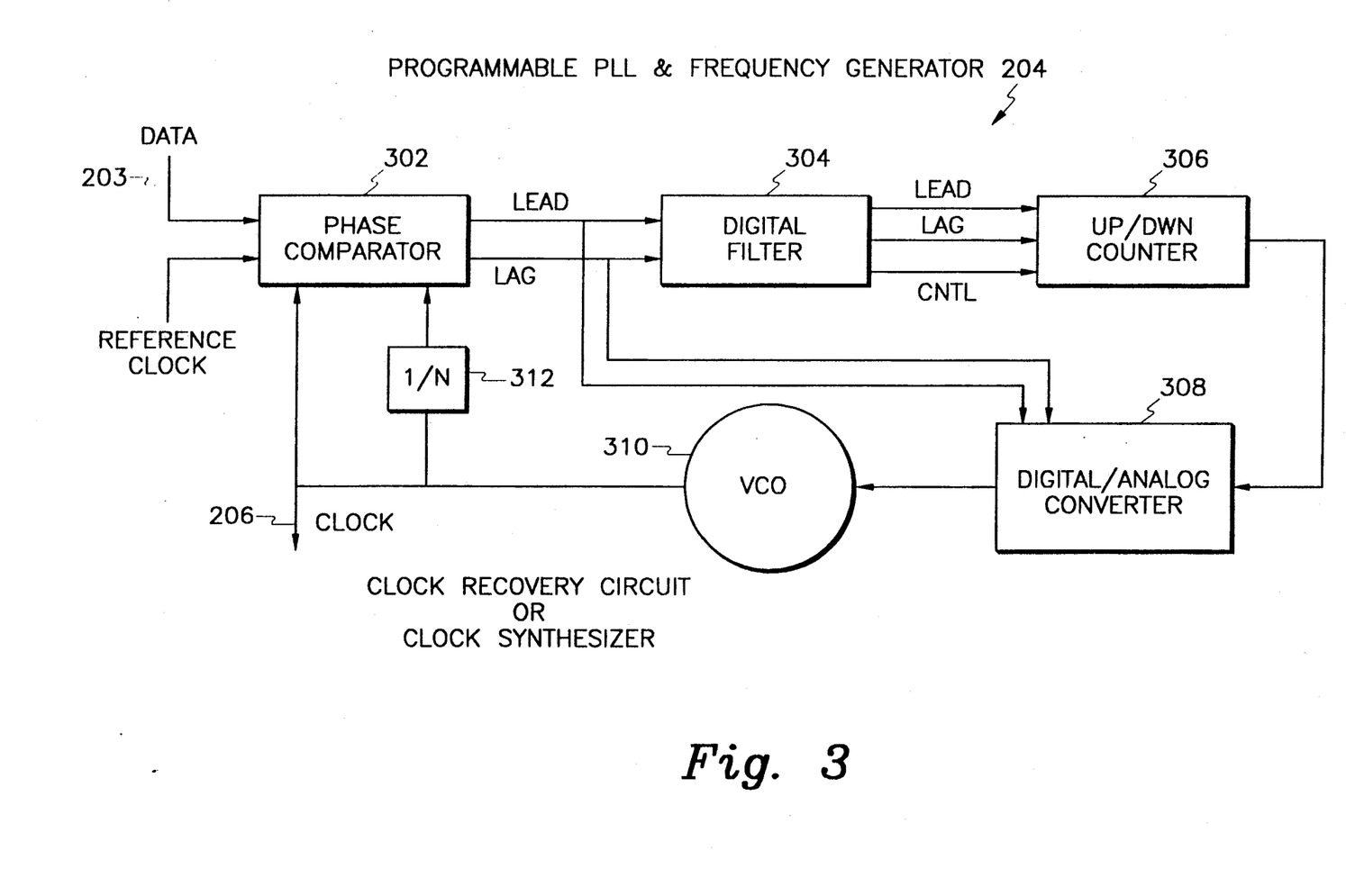
FIG. 3 illustrates a programmable phase locked loop 204 of the present invention.

FIG. 3 illustrates the programmable PLL 204. The PLL 204 has an all-digital voltage controlled oscillator (VCO) 310. The general structure and operation of the PLL 204 (other than the programmable aspects of the PLL 204) are well known in the art and are described in many publicly available documents, such as "Fully Integrated Gb/s Clock Recovery Circuit" by J. Ewen (1988 OFC Conference), which is herein incorporated by reference in its entirety. The PLL 221 in the transmit component 226 may also be implemented as shown in FIGS. 3 and 4.

Figure 4:
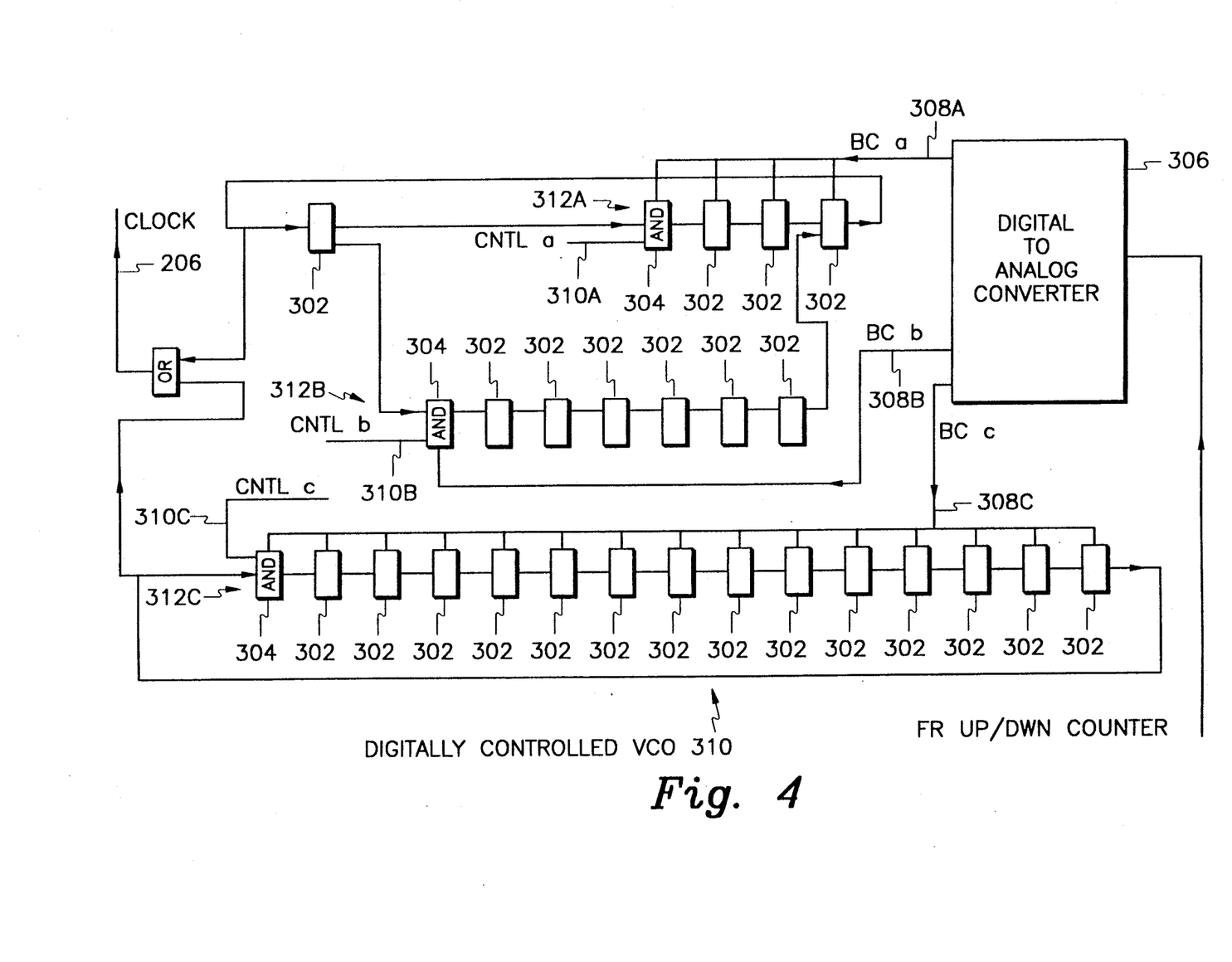
FIG. 4 illustrates a voltage controlled oscillator 310 of the present invention.

FIG. 4 illustrates the VCO 310 in greater detail. The VCO 310 of the present invention includes a selectable nominal frequency such that the nominal frequency of the PLL 204 may be programmed. The VCO 310 of the present invention is now described.

The VCO 310 of the present invention contains three chains 312. At any time, only one of the three chains 312 is enabled. The chains 312 are enabled by enabling their respective control (cntl) signals 310. The control signals 310 are sent from the matrix controller 110.

Each chain 312 corresponds to a different nominal frequency. Thus, the VCO 310 shown in FIG. 4 has three available (and selectable) nominal frequencies (generally, the VCO 310 of the present invention may contain more than three chains 312). The chain 312A corresponds to a high nominal frequency (such as 1 Gigabit/second). The chain 312B corresponds to a medium nominal frequency (such as 265 Mbit/second). The chain 312C corresponds to a low nominal frequency (such as 200 Mbit/second). The matrix controller 110 selects one of the three available nominal frequencies by enabling the respective control signal 310.

Each chain 312 contains an AND gate 304 (for receiving the control signal 310) and a series of logic gates 302. The gates 302, 304 receive operating current from a digital to analog converter 306 on lines 308. The chains 312, since they contain different numbers of logic gates 302, continuously generate pulses at different frequencies. Therefore, the chains 312 generate the different nominal frequencies for the PLL 204.

The receiver 202 in the receiver component 224 of each port 106 contains a photodetector for receiving the optical signals from the sources 104. In the switch 102 of the present invention, the photodetector is a dual wavelength (DW) photodetector which is optically sensitive to multiple wavelengths of interest (such as 1.3 u and 0.8 u). Such DW photodetectors are commercially available. For example, one such DW photodetector is the "Epitaxx ETX-GR" series photodiodes.

Figure 5:
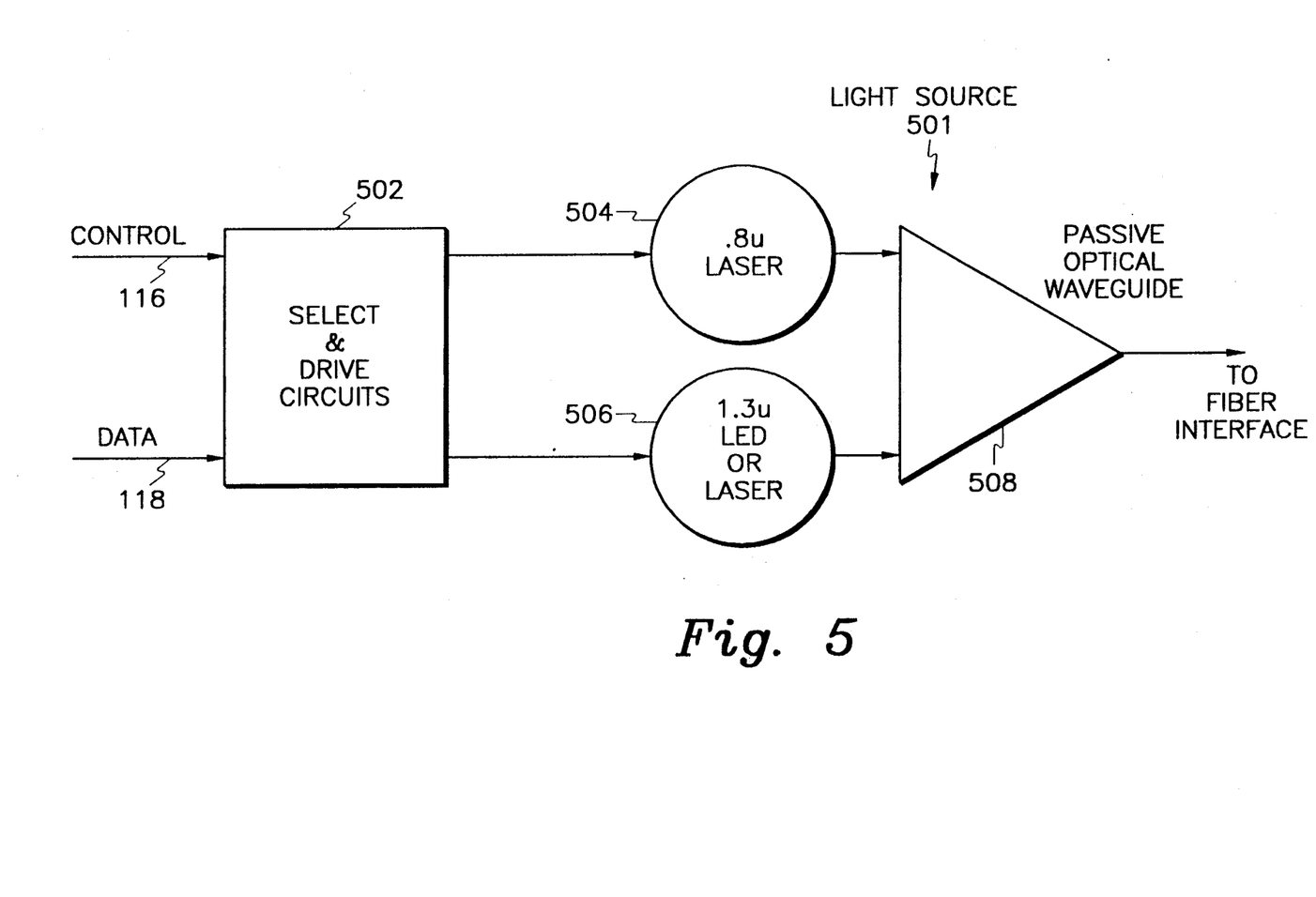
FIG. 5 illustrates a block diagram of a programmable light source 501 according to the present invention.

The transmitter 226 in the transmit component 226 of each port 106 contains a light source for optically transmitting the frames to the nodes 104. FIG. 5 illustrates a block diagram of a light source 501 according to the present invention. The light source 501 may transmit at multiple wavelengths (that is, 0.8 u and 1.3 u). A select and drive circuit 502, which is controlled by the matrix controller 110, selects either a 0.8 u laser 504 or a 1.3 u laser 506 (alternatively, light emitting diodes may be used). An optical combiner is fabricated with passive waveguides 508 on a common carrier with the light sources 504, 506. These techniques enable a low-cost, physically small assembly.

Because it detects and emits optical signals of different wavelengths, the switch 102 of the present invention simultaneously supports nodes 104 having different optical characteristics.

The matrix controller 110 of the present invention recognizes various combinations of port connections (based on information in the switch configuration table 112) and sets up appropriate controls at the ports 106. Various cases are possible.

First, a lower-speed port may be connected to a higher-speed port. In this case, the matrix controller 110 sets up a path in the matrix switch 108 and transmits idles from the lower-speed port to the higher-speed port. The incoming data in the lower-speed port accumulates in the elastic buffer 208 until a threshold is reached (this depends on the difference in bit-rates and the maximum frame size). Once the threshold is reached, the data is allowed to flow out of the buffer 208 and to the higher-speed port. If another frame is received, following the first frame, it is trapped in the elastic buffer 208 until the threshold condition is met. At the end of the first frame, the higher-speed port receives idles, until the second frame is sent out of the buffer 208.

Second, a higher-speed port may be connected to a lower-speed port. In this case, the matrix controller 110 allows the incoming data in the higher-speed port to flow immediately out of the higher-speed port's elastic buffer 208 to the lower-speed port. At the end of the frame, the transmitting node 104 to the higher-speed port sends idles. The higher-speed port ignores the idles from the node 104. That is, the idles are not loaded into the buffer. The idles provide necessary pacing between the different bit-rate transmissions.

While the invention has been particularly shown and described with reference to preferred embodiments thereof, it will be understood by those skilled in the art that various changes in form and details may be made therein without departing from the spirit and scope of the invention.

What is claimed is:

1. A communication switch comprising: three or more ports capable or transmitting and/or receiving data, including:
    a first port, coupled to a source node transmitting said data at a first frequency, for receiving data from said source node, and
    a second port, coupled to a destination node receiving said data at a
    second frequency,
    switch means, coupled to said three or more ports, for establishing a physical connection between any two ports of said three or more ports and for switching said physical connection between any combination of two ports of said three or more ports, wherein said combination of two ports are said first port and said second port; and
    means for serially and asynchronously transmitting said data from said first port to said second port via said physical connection.

2. The switch of claim 1, further comprising:
    a configuration table containing information regarding node connections and node frequencies; and
    control means, coupled to said configuration table, for controlling said first port, second port, and switch means.

3. The switch of claim 2, wherein said data comprises sequential data frames, and wherein said control means comprises means for transmitting idles when not transmitting said data frames from said first port to said second port when said first frequency is less than said second frequency.

4. A communication system comprising one or more communication switches, each of said switches comprising:
    three or more ports capable or transmitting and/or receiving data, including:
        a first port, coupled to a source node transmitting said data at a first frequency, for receiving data from said source node, and
        a second port, coupled to a destination node receiving said data at a second frequency;
    switch means, coupled to said three or more ports, for establishing a physical connection between any two ports of said three or more ports and for switching said physical connection between any combination of two ports of said three or more ports, wherein said combination of two ports are said first port and said second port; and
    means for serially and asynchronously transmitting said data from said first port to said second port via said physical connection.

5. In a communication switch having three or more ports, wherein any two ports of the three or more ports can be alternately physically connected, a method for transferring data from a first port to a second port, wherein a source node operating at a first frequency is coupled to the first port and a destination node operating at a second frequency is coupled to the second port, said method comprising the steps of:
    (a) serially receiving at the first port the data from the source node according to the first frequency;
    (b) selecting a data transfer frequency which is equal to, although out of phase with, the second frequency;
    (c) establishing a physical connection between the first port and the second port of said three or more ports;
    (d) serially and asynchronously transmitting the data from the first port to the second port via said physical connection according to said data transfer frequency;
    (e) receiving at the second port said data; and
    (f) serially transmitting from the second port said data to said destination node according to said second frequency.

6. The method of claim 5, wherein said step for serially receiving at the first port the data from the source node according to the first frequency comprises the steps of:
    (1) extracting said first frequency from the data; and
    (2) serially clocking said data into a buffer according to said first frequency.

7. The method of claim 5, wherein said step for serially and asynchronously transmitting the data from the first port to the second port via said physical connection according to said third frequency comprises the step of transmitting idles when not transmitting said data from the first port to the second port when said first frequency is less than said second frequency.

8. The method of claim 5, wherein said step for receiving at the second port said data comprises the step of adjusting for phase differences between said second frequency and said data transfer frequency which is equal to said second frequency.

9. A communication switch, comprising:
    three or more ports capable or transmitting and/or receiving data, including:
        a first port, coupled to a source node transmitting said data at a first frequency, for receiving data from said source node, and
        a second port, coupled to a destination node receiving said data at a second frequency;
    switch means, coupled to said three or more ports, for establishing a physical connection between any two ports of said three or more ports and for switching said physical connection between any combination of two ports of said three or more ports, wherein said combination of two ports are said first port and said second port; and
    means for serially and asynchronously transmitting said data from said first port to said second port via said physical connection; and
    control means for controlling said first port, second port, and switch means, said first port comprising:
        phase locked loop means for extracting said first frequency from said data,
        selector means, coupled to a control means, for selecting a data transfer frequency which is equal to, although out of phase with, a second frequency,
        buffer means coupled to a switch means,
        first pacing means for serially clocking said data into said buffer means according to said first frequency, and second pacing means for serially transmitting said data from said buffer means to said switch means according to said data transfer frequency.

10. The switch of claim 9, wherein said phase locked loop means comprises:
   means for generating multiple nominal frequencies; and
   means for selecting one of said nominal frequencies, wherein said selected nominal frequency equals said first frequency.

11. The switch of claim 9, wherein said source node and first port are connected via a fiber optic link carrying optical signals.

12. The switch of claim 9, further comprising receiver means, coupled to said source node, for receiving said optical signals, said receiver means comprising photodetector means for detecting said optical signals having different optical characteristics.

13. A communication switch, comprising:
   three or more ports capable or transmitting and/or receiving data, including:
      a first port, coupled to a source node transmitting said data at a first frequency, for receiving data from said source node; and
      a second port, coupled to a destination node receiving said data at a second frequency, having:
         phase synchronizing means for adjusting a phase difference between a data transfer frequency and said second frequency, and
         transmitter means, coupled to said phase synchronizing means, for serially transmitting said data to said destination at said second frequency;
   switch means, coupled to said three or more ports, for establishing a physical connection between any two ports of said three or more ports and for switching said physical connection between any combination of two ports of said three or more ports, wherein said combination of two port are said first port and said second port;
   means for serially and asynchronously transmitting said data from said first port to said second port via said physical connection; and
   control means for controlling said first port, second port, and said switch means.

14. The switch of claim 13, wherein said destination node and second port are connected via a fiber optic link carrying optical signals.

15. The switch of claim 14, wherein said transmitter means comprises light source means for generating said optical signals having different optical characteristics.

16. A communication switch comprising:
   three or more ports capable or transmitting and/or receiving data, including:
      a first port, coupled to a source node transmitting said data at a first frequency, for receiving data from said source node, and
      a second port, coupled to a destination node receiving said data at a second frequency;
   switch means, coupled to said three or more ports, for establishing a physical connection between any two ports of said three or more ports and for switching said physical connection between any combination of two ports of said three or more ports, wherein said combination of two ports are said first port and said second port;
   means for serially and asynchronously transmitting said data from said first port to said second port via said physical connection;
   a configuration table containing information regarding node connections and node frequencies; and
   control means, coupled to said configuration table, for controlling said first port, second port, and switch means; wherein said first port comprises:
      phase locked loop means for extracting said first frequency from said data,
      selector means, coupled to said control means, for selecting a data transfer frequency which is equal to, although out of phase with said second frequency,
      buffer means coupled to said switch means,
      first pacing means for serially clocking said data into said buffer according to said first frequency, and
      second pacing means for serially transmitting said data from said buffer to said switch means according to said data transfer frequency.

17. The switch of claim 16, wherein said phase locked loop means comprises:
   means for generating multiple nominal frequencies; and
   means for selecting one of said nominal frequencies, wherein said selected nominal frequency equals said first frequency.

18. The switch of claim 16, wherein said source node and first port are connected via a fiber optic link carrying optical signals.

19. The switch of claim 18, further comprising receiver means, coupled to said source node, for receiving said optical signals, said receiver means comprising photodetector means for detecting said optical signals having different optical characteristics.

20. A communication switch comprising:
   three or more ports capable or transmitting and/or receiving data, including:
      a first port, coupled to a source node transmitting said data at a first frequency, for receiving data from said source node, and
      a second port, coupled to a destination node receiving said data at a second frequency, and comprising:
         phase synchronizing means for adjusting for a phase difference between said second and a data transfer frequency, and
         transmitter means, coupled to said phase synchronizing means, for serially transmitting said data to said destination at said second frequency;
   switch means, coupled to said three or more ports, for establishing a physical connection between any two ports of said three or more ports and for switching said physical connection between any combination of two ports of said three or more ports, wherein said combination of two ports are said first port and said second port;
   means for serially and asynchronously transmitting said data from said first port to said second port via said physical connection;
   a configuration table containing information regarding node connections and node frequencies; and
   control means, coupled to said configuration table, for controlling said first port, second port, and switch means.

21. The switch of claim 20, wherein said destination node and second port are connected via a fiber optic link carrying optical signals.

22. The switch of claim 21, wherein said transmitter means comprises light source means for generating said optical signals having different optical characteristics.

* * * * *